G. A. LOWRY.
SPIGOT.
APPLICATION FILED APR. 18, 1911.
1,021,055.
Patented Mar. 26, 1912.
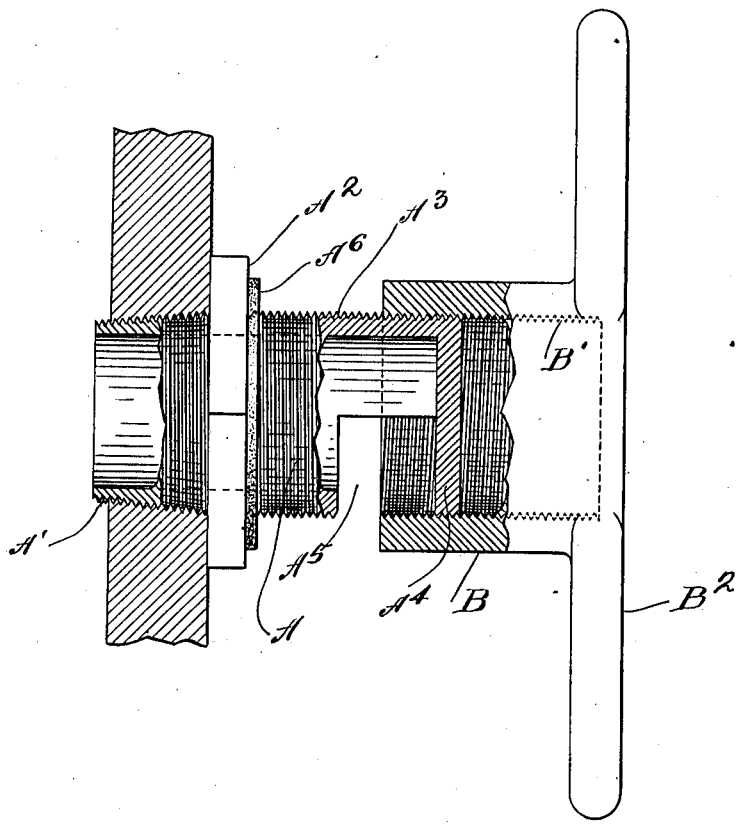

UNITED STATES PATENT OFFICE.

GEORGE A. LOWRY, OF BOSTON, MASSACHUSETTS.

SPIGOT.

1,021,055.  Specification of Letters Patent.  Patented Mar. 26, 1912.

Application filed April 18, 1911. Serial No. 621,758.

*To all whom it may concern:*

Be it known that I, GEORGE A. LOWRY, a citizen of the United States, and resident of the city of Boston, in the county of Suffolk and State of Massachusetts, have invented new and useful Improvements in Spigots, of which the following is a specification.

My invention relates to faucets or spigots and is intended and adapted to be detachably affixed to a liquid containing vessel such as a barrel.

The main object of my improvements is to provide a spigot which will be simple and cheap to construct, but nevertheless liquid tight when closed.

In the drawings hereto annexed there is shown partly in side elevation and partly in section a spigot which illustrates my improvements.

The spigot proper designated comprehensively by the letter A consists of a tubular cast metal piece preferably cast iron having a tapered screw thread in the portion $A'$ adapted to be screwed into a hole in a barrel or similar receptacle, an annular flange $A^2$ which may be square or hexagonal to afford means for screwing the inner portion into the barrel, and an outer portion having an inclosing wall $A^4$ at its end and a liquid outlet aperture $A^5$ which extends only part way back from the outer end of the spigot toward the flange $A^2$. The outer portion is screw threaded as at $A^3$ substantially throughout its entire length. If desired a washer $A^6$ may be applied although if the device is constructed with a reasonable degree of accuracy and fit, such a washer will not be found necessary.

A cap B having a socket portion internally threaded at $B'$ and a handle $B^2$ is made to screw over the threaded outer portion of the spigot A with a fairly close fit. When the cap B is screwed home over the outer portion of the spigot it maintains a tight closure for the reason that the extent and length of the screw threads on these mutually fitting parts is such that the capillary attraction for the metal of the liquid in the interior of the spigot is sufficient to overcome the hydrostatic pressure which otherwise would tend to make the spigot leak. The threaded portion of the spigot between the opening $A^5$ and the flange $A^2$ should therefore occupy a substantial portion of the outer end of the spigot so as to afford ample length of screw threads to enable the capillary attraction to overcome the tendency to leak. The washer $A^6$ may be provided as a measure of extra precaution, but in most instances will be unnecessary.

The mode of opening the spigot to allow fluid to escape is obvious; the extent of the opening can be nicely graduated by means of the screw thread connection between the outer end of the spigot and the inclosing cap.

What I claim and desire to secure by Letters Patent is:

The combination of a spigot, tubular in form, provided with an inner portion adapted to securement to a liquid containing vessel, an outer portion having a lateral opening, near the end thereof, said outer portion screw threaded throughout substantially its entire length, and an internally threaded cap to screw on said outer portion of the spigot, covering said opening and such a substantial extent of the screw threaded portion of the spigot behind the opening when screwed home as to enable capillary adhesion of liquid to the threaded portion to effect complete closure of the containing vessel.

Signed by me at Wildwood, Florida, this tenth day of April, 1911.

GEORGE A. LOWRY.

Witnesses:
 BERTHA McNALLY,
 A. STENGLE.

---

Copies of this patent may be obtained for five cents each, by addressing the "Commissioner of Patents, Washington, D. C."